United States Patent [19]

Deminet

[11] 4,216,765
[45] Aug. 12, 1980

[54] TRANSPARENT SOLAR HEAT COLLECTOR

[75] Inventor: Czeslaw Deminet, Kent, Wash.

[73] Assignee: The Boeing Company, Seattle, Wash.

[21] Appl. No.: 882,533

[22] Filed: Mar. 1, 1978

[51] Int. Cl.² ............................................. F24J 3/02
[52] U.S. Cl. .................................... 126/449; 126/445
[58] Field of Search ............... 126/270, 271, 449, 446, 126/441, 431, 429, 445; 237/1 A

[56] References Cited

U.S. PATENT DOCUMENTS

| | | | |
|---|---|---|---|
| 3,955,555 | 5/1976 | Bostrom | 126/270 |
| 3,981,294 | 9/1976 | Deminet et al. | 126/271 |
| 4,050,443 | 9/1977 | Peck et al. | 126/270 |
| 4,127,102 | 11/1978 | Berman | 126/270 |

FOREIGN PATENT DOCUMENTS 2351364  12/1977  France ...................................... 126/270

*Primary Examiner*—James C. Yeung
*Assistant Examiner*—Larry Jones
*Attorney, Agent, or Firm*—Thomas H. Murray; Clifford A. Poff

[57] ABSTRACT

Infrared solar radiation is absorbed by a transparent converter glass for conversion of the infrared radiation into thermal energy. Liquid or air forms a transparent fluid medium that is conducted into heat transfer contact with the glass to carry the thermal energy away from the glass to a point of utilization. In one embodiment, the transparent converter glass consists of sintered particles of infrared absorptive glass located within a collector space formed within an all-glass panel. The panel includes glass walls extending outwardly of the walls forming the collector space. In a further embodiment, the transparent converter glass consists of elongated strips of infrared absorptive glass carried by support members so that the strips extend in a parallel, spaced-apart relation to form a venetian blind-like structure between glass panels. In a still further embodiment, the transparent converter glass consists of a slab of infrared absorptive glass extending vertically within a building structure to form a passageway for the flow of convectively-driven air between the glass slab and two window panels forming a dry airspace therebetween. Instead of a thick unitary glass slab, smaller bricks of infrared absorptive glass are arranged to form courses of an internal wall within a building structure adjacent a glass window.

5 Claims, 10 Drawing Figures

U.S. Patent  Aug. 12, 1980  4,216,765

TRANSPARENT SOLAR HEAT COLLECTOR

BACKGROUND OF THE INVENTION

This invention relates to a transparent solar heat collector utilizing solar radiation to heat and illuminate the interior of a building structure. More particularly, the present invention relates to employing infrared absorptive glass to convert preferably at least 90% of incident infrared radiation within the spectrum of incident solar radiation on the glass into thermal energy.

The concept of providing a converter member to absorb heat from incident solar radiation is not new in the art. In U.S. Pat. No. 3,981,293, there is disclosed a solar heat collector wherein a cover plate is mounted in a spaced relation to a solar heat absorber having a surface defining an absorption coefficient for solar radiation that is either different or the same as the emissivity coefficient for infrared energy. A copper oxide coating on the absorber provides an absorptive coefficient that is greater than the emissive coefficient for infrared energy. The absorptive and emissive coefficients are the same for infrared energy on a black surface. The absorber undergoes heating by the absorption of solar radiation. Heat from the absorber is used to heat an absorbing medium, such as water, or a mixture of ethylene glycol and water.

In U.S. Pat. No. 3,981,294, assigned to the same assignee as this application, there is disclosed an all-glass composite building panel wherein a heat absorbing membrane is positioned within a passageway for a black liquid. The membrane is used to absorb heat and transmit the heat to the liquid moving through the passageway. The passageway is formed by an all-glass construction that additionally includes a vacuum cell of an all-glass construction overlying the face surface of the liquid passageway. While these known forms of solar collectors include the use of glass to form the collector structure, they nevertheless are not transparent to the visible light spectrum so as to enable use of such forms of solar collectors to illuminate as well as supplying heat to a building structure. In other words, from an architectural standpoint, opaque solar heat collectors are unusable as skylights and windows for a building structure. Moreover, transparent solar collectors offer greater architectural acceptance.

There are other solar heat collector designs wherein the circulating heat transfer fluid is air. The solar energy is absorbed by a metal structure coated with a selective absorption material. One form of such solar heat collector is based on the idea of a venetian blind-type collector wherein long narrow collector plates provide a large area for the absorption of solar energy. These strips are coated with a film of black paint to increase the heat absorbing property of the metal. The heat absorbing strips extend in a spaced-apart parallel relation between panels used to form a passageway for air to undergo heating by the strips.

The present invention is based on the discovery that commercially-available glasses transmit up to about 90% of the visible radiation within the spectrum of solar radiation. However, such glasses absorb nearly 100% infrared radiation. The present invention is, therefore, based on utilizing the unique heat absorbing properties of such glasses to form an absorber for infrared radiation within the spectrum of incident solar radiation for conversion into thermal energy.

SUMMARY OF THE INVENTION

It is an object of the present invention to provide a transparent solar heat collector utilizing solar radiation for heating and illuminating a building structure wherein a transparent converter glass is employed to convert infrared radiation within the spectrum of incident solar radiation into thermal energy.

It is a further object of the present invention to provide a transparent solar heat collector utilizing solar radiation for heating and illuminating a building structure wherein sintered particles of infrared absorptive glass convert infrared radiation into thermal energy within a compartment formed by an all-glass wall construction with an overlying vacuum cell formed by the glass walls.

It is still another object of the present invention to provide a transparent solar heat collector utilizing solar radiation for heating and illuminating a building structure wherein elongated strips of infrared absorptive glass carried by support means in a parallel spaced-apart relation, transform incident solar radiation into thermal energy for heating convectively-driven air currents within a passageway containing the glass strips and formed by spaced-apart glass panels.

It is a still further object of the present invention to provide a transparent solar heat collector utilizing solar radiation for heating and illuminating a building structure wherein a slab of infrared absorptive glass extends vertically along a double-walled window panel for transforming absorbed infrared radiation incident on the slab into thermal energy. An internal wall within the building structure is constructed, if desired, from superimposed courses of such bricks made from the infrared absorptive glass.

More particularly, according to the present invention, there is provided a transparent solar heat collector utilizing solar radiation for heating and illuminating a building structure, the solar heat collector comprising transparent converter glass absorptive to at least about 90% of the infrared radiation within the spectrum of incident solar radiation upon the glass for conversion of the infrared radiation into thermal energy, support means carrying the transparent converter glass for exposure to solar radiation and the transmission of light into the building structure, and means to pass a transparent fluid medium into heat transfer contact with the transparent converter glass to carry thermal energy from the glass into the building structure.

These features and advantages of the present invention as well as others will be more fully understood when the following description is read in light of the accompanying drawings, in which.

Figures 1, 2:
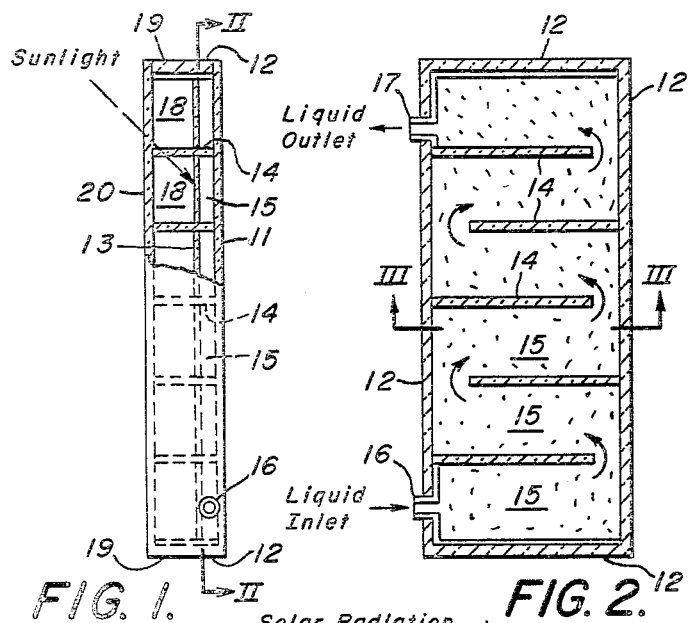
FIG. 1 is an end elevational view, partly in section, of a solar heat collector panel according to one embodiment of the present invention.
FIG. 2 is a sectional view taken along line II—II of FIG. 1.
Figure 3:
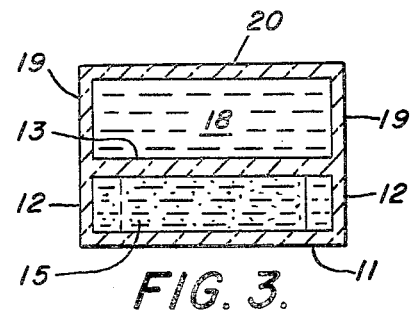
FIG. 3 is a sectional view taken along line III—III of FIG. 1.

The transparent solar heat collector shown in FIGS. 1–3 is particularly suitable for use as a closure for a window opening in a building structure to form a skylight or a window within a side wall. This form of solar heat collector embodies an all-glass construction which includes a back wall 11 joined about its perimeter by upstanding side walls 12 to an outwardly-spaced front wall 13. The space enclosed by walls 11, 12 and 13 is further subdivided by partitions 14. As shown in FIG. 2, successively-arranged partitions alternately terminate short of a side wall to form a serpentine-like passageway 15 for a heat transfer liquid. The liquid which forms a transparent heat transfer medium is fed into the collector panel through an inlet nozzle 16 where the liquid flows along the serpentine path to an outlet nozzle 17. The front wall 13 forms the floor wall for vacuum cells 18. The vacuum cells 18 are further defined by side walls 19 that support a cover plate 20. The glass material used to form these collector walls is a low expansion, well-known glass including, for example, pyrex glass. According to the present invention, a transparent converter glass is incorporated into the liquid passageway to form an absorber that undergoes heating by incident infrared radiation to heat the liquid heat transfer medium in the passageways 15. In this regard, the transparent converter glass consists of sintered particles or precast shapes of infrared absorptive glass. The volume of such glass particles used is selected to substantially fill the space between the side walls 12 and the partition walls 14. However, sufficient space must remain within the passageways 15 for the flow of heat transfer fluid such as air or water. The important concept of the present invention is to form the glass particles from a glass that transmits over 70% of the visible light within the spectrum of incident solar radiation. At the same time, the sintered glass particles or precast shapes absorb at least about 90% and, depending upon the selected glass, nearly 100% of infrared radiation incident on the collector.

Figure 4:
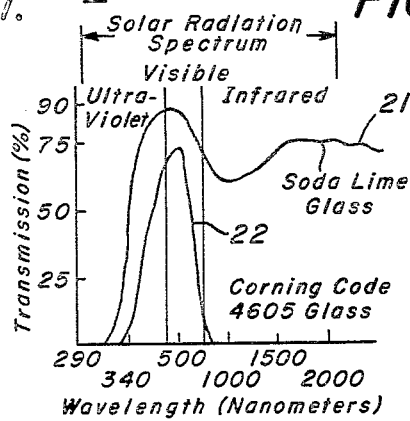
FIG. 4 is a graph illustrating the transmittance properties of soda-lime glass and one form of infrared absorptive glass which is suitable for use according to the present invention to form the transparent converter glass.

FIG. 4 illustrates, by graph line 21, the percent of transmission by soda-lime glass for the spectrum of solar radiation. As is well known, soda-lime glass transmits between 75% and 90% of the visible light spectrum within the solar radiation spectrum. However, as shown in FIG. 4, soda-lime glass transmits about 75% of incident infrared radiation which renders such glass of little value for use as a converter to transform infrared radiation to thermal energy. Graph line 22 represents a transmission of properties of one form of unique glass having an almost 100% absorption property for infrared radiation while at the same time the glass transmits between 75% and 90% of incident visible light. The glass, represented by graph line 22, is a developement by Corning Company. This glass is commercially available and designated as Code 4605 Glass. The infrared absorbing properties of this glass have found other practical applications, e.g., a heat absorbing form of optical filter in a light projector.

Figure 5:
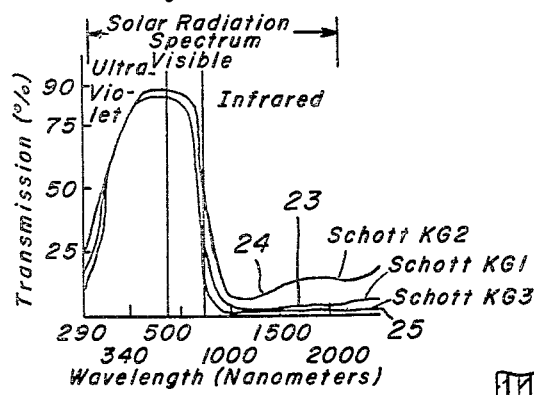
FIG. 5 is a graph similar to FIG. 4 but illustrating the transmittance properties of three other forms of glass suitable to form the transparent converter for infrared radiation according to the present invention.

FIG. 5 illustrates other forms of infrared absorptive glass that are equally useful to form particles of transparent converter glass. Graph lines 23–25 illustrate three of a KG series of glasses manufactured by Shott Company. Graph line 23 shows the almost total absorptive property in percent of Shott KG1 glass while the corresponding properties are illustrated by graph line 24 in regard to Shott KG2 glass. The greatest infrared absorptive Shott glass is KG3 shown by graph line 25.

In the preferred form of the present invention, the absorbed infrared radiation by the sintered or precast particles of glass contained within the all-glass collector are carried away by a fluid having a matching refractive index to thereby minimize losses due to reflection.

Figure 6:
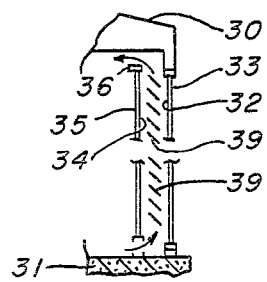
FIG. 6 is an elevational view, in cross section, of a building structure illustrating a second embodiment of a transparent solar heat collector according to the present invention.
Figure 7:
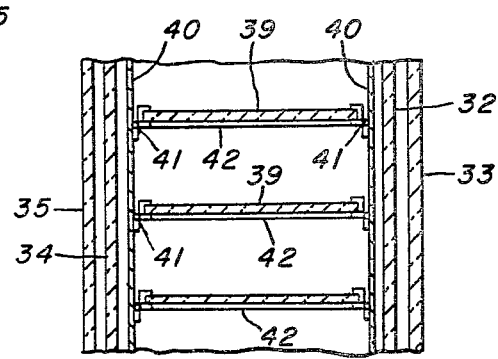
FIG. 7 is an enlarged view of the transparent solar heat collector shown in FIG. 6.

FIGS. 6 and 7 illustrate a second embodiment of the present invention wherein the heat transfer medium is air which is convectively driven by natural convection. As illustrated, a portion of a building structure includes a roof 30 supported by side walls, not specifically shown, that are, in turn, supported by a foundation 31. A window opening in the side walls receives two spaced-apart glass panels 32 and 33 that are, in turn, supported by a frame in a well-known manner so that dry air between the glass panels forms an insulation barrier by the air cell. Other glass panels 34 and 35 are carried by a frame 36 to form a dry air cell between the panels. The frame 36 is constructed so as to provide an entranceway along the bottom edge of the panels for flow of air within the space between panels 34, 35 and 32, 33. At the top of the frame 36 there is a passageway to discharge air into the space within the building structure. The air flowing between the two sets of glass panels undergoes heating by contact with elongated strips 39 of infrared absorptive glass. This glass corresponds to the infrared absorptive glass described hereinbefore in regard to FIGS. 1–5. The glass employed to form panels 32, 33, 34 and 35 is typically low-expansion pyrex glass, but soda-lime glass can be used to provide the desired transmittance properties of incident solar radiation within both the spectrum of visible light and infrared radiation. As shown in FIG. 7, the strips 39 of infrared absorptive glass are supported along their opposite edges in a spaced-apart parallel relation by vertically-extending carrier strips 40. The carrier strips are connected to the glass strips 39 by pivots 41. If desired, support strips 42 form intermediate carrier members that support the glass strips 39 and are attached at their opposite ends by hinge members to provide the pivot 41. By employing this arrangement of parts to support the glass strips 39, a venetian blind-type structure is provided within the space between glass panels 32, 33 and 34, 35. The strips 40 at opposite sides of the glass strips 39 are moved in opposite directions by a rotary shaft in a well-known manner to thereby position the glass strips for controlling the surface areas thereof which are exposed to infrared radiation. The horizontal arrangement of glass strips 39 may be rearranged so that the strips extend vertically within the space between the glass panels 32, 33 and 34, 35 without departing from the present invention. The plurality of glass strips 39 in a venetian blind-type structure to form a solar heat collector provides a large surface area for the absorption of infrared radiation as compared to the area of the window glass. This large absorption surface area provides efficient heat transfer. The heat transferred to the convectively-driven air currents is either directed into the building structure or discharged externally of the building to carry heat away from the building as may be desirable for cooling. The heated currents of air can also be directed by forced circulation to a rock heat storage unit. This form of solar heat collector supplies light into the building with very small losses.

Figure 8A:
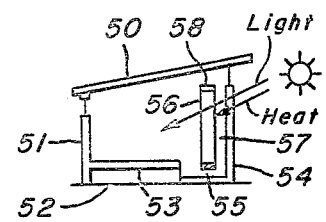
FIGS. 8A–8C are elevational views, in cross section, illustrating different modes of operation for a third embodiment of a transparent solar heat collector according to the present invention.
Figure 8B:
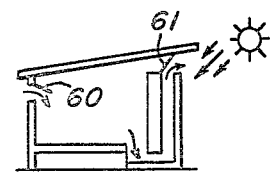
Figure 8C:
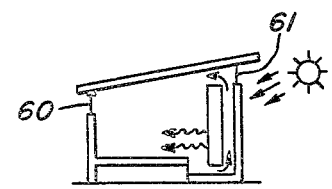

FIG. 8A illustrates a third embodiment of the present invention wherein the principle of a Trombe wall is employed to form a passive solar heat collector wherein solar energy transmitted through a double-paneled glass window is absorbed during the day by a transparent slab of infrared absorptive glass. Heat is carried away from the glass slab during the night by currents of convectively-driven air. In FIG. 8A, a building structure is illustrated and includes a roof 50 supported by side walls 51 upon a foundation 52. A raised floor 53 has a stepped trough 54 along a portion of one side edge thereof which is adjacent a window assembly 55 situated for a southern exposure. The window assembly 55 is made by supporting two window panels on a frame to form an insulating cell between the window panels in the same manner as described hereinbefore in regard to FIG. 6. A thick slab 56 of infrared radiation absorptive glass extends vertically at a spaced-apart and generally parallel relation to the window 55 to form a vertical passageway 57 for convectively-driven currents of air. The slab 56 is supported by a frame structure 58 so that currents of air are drawn from within the building downwardly beneath the slab and the window assembly 55. As shown in FIG. 8B, an air flap 60 at the upper part of the wall facing toward the north is opened to form an air supply. A flap 61 at the top of the southerly exposed wall is opened so that the rising currents of heated air are drawn to the outside by a chimney effect. This arrangement provides effective summer cooling for the building structure. FIG. 8C illustrates use of the Trombe wall principle in accordance with the present invention for heating a building during the winter months. For this purpose, the flaps 60 and 61 at the top parts of the northerly and southerly exposed walls are closed. The slab 56 of infrared absorptive glass is heated during the day of infrared radiation whereby direct air current heating within the building structure occurs by convection. Heating also occurs by radiation of heat from the slab 56. The slab 56, made of infrared absorptive glass material, admits light into the building structure while absorbing heat. Depending upon the composition of the infrared absorptive glass, total infrared absorption can be obtained with a glass thickness of as much as 300 millimeters. This allows visible light within the spectrum of incident solar radiation to pass through the glass slab without sacrificing the heat capacity of the slab. To overcome manufacturing and handling difficulties, the Trombe wall is preferably constructed from superimposed courses of glass bricks having a convenient size and interlocking grooves. A Trombe wall of infrared absorptive glass within the building structure provides significant advantage since the infrared radiation is absorbed within the infrared absorptive glass member due to internal dispersion. On the other hand, a Trombe wall made of masonry material absorbs heat only on the surface of the wall and then part of the heat is conducted to the interior of the wall while a substantial part of the heat is lost due to radiation losses.

In view of the foregoing, it is believed apparent that a Trombe wall constructed in accordance with the present invention may be temporarily employed in any room of a building structure having a southern exposure with only a small light loss. By embodying the principle of a Trombe wall according the present invention in a greenhouse, pillars of infrared absorptive glass formed as either a slab or a wall made from courses of bricks of such glass may be readily situated at any desired location within a greenhouse. During the day, the infrared absorptive glass collects and stores heat while transmitting visible light which is needed by plant life for photosynthesis. The accumulated heat within the wall is then radiated during the night and evenly distributed by convection currents within the greenhouse.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A transparent solar heat collector utilizing solar radiation for heating and illuminating a building structure, said transparent solar heat collector comprising:
   an absorber comprising, a collection of transparent converter glass particles absorptive by internal dispersion of at least 90% of the infrared radiation within the spectrum of incident solar radiation on said glass for conversion of infrared radiation into thermal energy and transmittive of at least 70% of the visible spectrum of solar radiation,
   a glass panel including front and rear walls transparent to visible radiation, said walls forming a confining space for carrying said transparent converter glass particles for exposure to solar radiation and the transmission of visible radiation into said building structure, said front wall transparent to infrared radiation within the spectrum of solar radiation, and
   means to pass a fluid medium which is transparent to visible radiation into heat transfer contact with said transparent converter glass particles to transfer thermal energy from said transparent converter glass particles to said fluid medium and into said building structure.

2. The transparent solar heat collector according to claim 1 wherein said all-glass panel includes a glass back wall with projecting glass side walls carrying an outwardly-spaced glass front wall to form an enclosed particle confining space containing said transparent converter glass, said means to pass transparent fluid medium communicating with said particle confining space.

3. The transparent solar heat collector according to claim 2 wherein said transparent converter glass particles are sintered.

4. The transparent solar heat collector according to claim 2 wherein said all-glass panel further includes a glass cover plate joined by glass side walls to said glass front wall for defining an air insulation cell outwardly of said enclosed particle confining space.

5. The transparent solar heat collector according to claim 1 wherein said transparent converter glass particles are precast shapes of particles.

* * * * *